(12) United States Patent
Arimoto et al.

(10) Patent No.: US 6,960,884 B2
(45) Date of Patent: Nov. 1, 2005

(54) DEVICE FOR OPERATING A SHORT ARC DISCHARGE MERCURY LAMP

(75) Inventors: Tomoyoshi Arimoto, Tatuno (JP); Katumi Sugaja, Takasago (JP); Yoshikazu Suzuki, Yokohama (JP)

(73) Assignee: Ushiodenki Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/867,774

(22) Filed: Jun. 16, 2004

(65) Prior Publication Data

US 2005/0007023 A1     Jan. 13, 2005

(30) Foreign Application Priority Data

Jun. 27, 2003  (JP) .............................. 2003-183771

(51) Int. Cl.⁷ .......................... H01J 17/20; H05B 37/02
(52) U.S. Cl. ...................... 313/642; 313/639; 313/642; 315/291; 315/224
(58) Field of Search .............................. 313/642, 639, 313/641, 643; 315/168, 169.1, 291, 224; H01J 17/20

(56) References Cited

U.S. PATENT DOCUMENTS

| 5,109,181 A | 4/1992 | Fischer et al. |
| 5,497,049 A | 3/1996 | Fischer |
| 6,545,430 B2 | 4/2003 | Ono et al. |
| 6,815,895 B2 * | 11/2004 | Hirao ........................ 313/637 |
| 6,844,679 B1 * | 1/2005 | Horiuchi et al. ............ 313/642 |
| 6,861,806 B2 * | 3/2005 | Kumada et al. ............ 313/623 |
| 6,888,311 B2 * | 5/2005 | Hirao ........................ 313/631 |
| 6,903,509 B2 * | 6/2005 | Kanzaki ..................... 313/631 |

FOREIGN PATENT DOCUMENTS

| JP | 2001-059900 | 3/2001 |
| JP | 2001-174596 | 6/2001 |

* cited by examiner

Primary Examiner—Trinh Vo Dinh
Assistant Examiner—Binh Van Ho
(74) Attorney, Agent, or Firm—Nixon Peabody LLP; David S. Safran

(57) ABSTRACT

A short arc ultra-high pressure mercury lamp, at least one of the electrodes of which has a melted part towards the electrode head and a coil part which extends from the melted part continuously and integrally with it in a direction away from the electrode head, avoids blackening of the tube wall and achieves a long service life by the provision of a power supply which supplies the discharge lamp with direct current when operation is starting and afterwards supplies it with an alternating current, the direct current supplied by the power supply to the discharge lamp being initially 0.3 to 0.6 times as great as the rated current and afterwards increasing to 1.0 to 2.0 times are great as the rated current.

6 Claims, 5 Drawing Sheets

DEVICE FOR OPERATING A SHORT ARC DISCHARGE MERCURY LAMP

BACKGROUND OF THE INVENTION

1. Field of the Invention

The invention relates to a device for operating a short arc discharge lamp. The invention relates especially to a device for operating an ultra-high pressure mercury lamp in which an arc tube is filled with at least 0.15 mg/mm³ of mercury and in which the mercury vapor pressure during operation is at least 110 atm, and which is used for a light source for a projector device, such as a liquid crystal display device or a DLP (digital light processor using a DMD (digital micro mirror device) or the like.

2. Description of the Related Art

In a projection-type display device, there is a demand for illumination of images onto a rectangular screen in a uniform manner and with adequate color rendering. Therefore, the light source is a metal halide lamp which is filled with mercury and a metal halide. Furthermore, recently smaller and smaller metal halide lamps, and more and more often point light sources are being produced and metal halide lamps with extremely small distances between the electrodes are being used in practice.

Against this background, instead of metal halide lamps, lamps with an extremely high mercury vapor pressure, for example, with 150 atm, have been recently proposed. Here, the broadening of the arc is suppressed (the arc is compressed) by the increase of the mercury vapor pressure and a great increase of light intensity is the goal.

These ultra-high pressure discharge lamps are disclosed, for example, in Japanese patent disclosure document HEI 2-148561 (corresponding to U.S. Pat. No. 5,109,181), Japanese patent disclosure document HEI 6-52830 (corresponding to U.S. Pat. No. 5,497,049), and Japanese patent specification 2980882.

For the above described lamp, for example, an ultra-high pressure mercury lamp is used in which, in the silica glass arc tube, there is a pair of opposed electrodes that are separated from each other by a distance of at most 2 mm and in which this arc tube is filled with at least 0.15 mg/mm³ of mercury and halogen in the range from $1\times10^{-6}$ μmole/mm³ to $1\times10^{-2}$ μmole/mm³. The main purpose of adding the halogen is to prevent devitrification of the arc tube. However, in this way, the so-called halogen cycle also arises.

In the above described ultra-high pressure mercury lamp (hereinafter also called only a "discharge lamp") there are cases in which, in the course of operation, the tungsten comprising the electrodes is transported to the inner surface of the discharge vessel and that so-called blackening of the tube wall occurs in which tungsten adheres to the inner surface of the discharge vessel. This blackening of the tube wall causes a reduction of the light intensity and furthermore breaking of the discharge vessel by increasing the thermal load on the tube wall in the case to considerable blackening of the tube wall; this leads to a shortening of the service life of the lamp.

SUMMARY OF THE INVENTION

A primary object of the present invention is to devise a short arc ultra-high pressure mercury lamp in which the above described blackening of the tube wall as a result of the tungsten of the electrodes being transported to the inner surface of the discharge vessel is suppressed and which has a long service life.

The above described object is achieved according to a first aspect of the invention in a device for operating a short arc discharge lamp which comprises the following:

a short arc discharge lamp in which in the silica glass arc tube there is a pair of opposed electrodes separated by a distance of 2 mm or less and in which the arc tube is filled with at least 0.15 mg/mm³ of mercury, a rare gas and halogen in an amount in the range from $1\times10^{-6}$ μmole/mm³ to $1\times10^{-2}$ μmole/mm³, a power supply which supplies the discharge lamp with direct current when operation is starting and afterwards with an alternating current, by at least one of the electrodes being provided with a melt part towards the electrode head, the melt part having been formed by winding the electrode rod with a coil and by melting the part of the coil which is oriented toward the electrode head at least in the area of its surface, and has a coil part which adjoins this melt part continuously and integrally with it in the direction away from the electrode head, and that the power supply is made to provide the discharge lamp with a direct current which is 0.3 to 0.6 times as great as the rated current at the start and afterwards is 1.0 to 2.0 times as great as the rated current.

The object is furthermore achieved according to a second aspect of the invention in the above described device for operating a short arc discharge lamp in that the shortest distance between the coil part and the inside surface of the arc tube is not more than 2.0 mm.

The object is furthermore achieved according to a third aspect of the invention in the above described device for operating a short arc discharge lamp in that the electrode consists of tungsten with a purity of at least 99.9999%.

The object is furthermore achieved according to another aspect of the invention in the above described device for operating a short arc discharge lamp in that on the head of the electrode a tip is formed.

The inventors as a result of assiduous research found that the disadvantage of the formation of blackening of the tube wall as a result of the transport of the tungsten comprising the electrodes to the inner surface of the discharge vessel is caused by contact of the discharge arc with the inner surface of the discharge vessel in the formation of the discharge arc at the beginning of start-up of the lamp, the back end of the coil acting as the starting point.

It was found that, as a result of this phenomenon, by the contact of the discharge arc which proceeds from the back end of the coil with the inside surface of the discharge vessel, vaporization of the silica glass comprising the discharge vessel has a great effect on the transport of the tungsten.

It was confirmed that this phenomenon clearly occurs especially in a discharge lamp with electrodes which have a melt part and a coil part on the back end and with a small, extremely short distance between the electrodes and the inside surface of the discharge vessel.

The inventors have found that, to achieve the above described new object with respect to a short arc discharge lamp, it is effective to regulate the current supply from the power supply to the discharge lamp at the beginning of lamp start-up.

The invention is further described below with reference to the accompanying drawings.

DETAILED DESCRIPTION OF THE INVENTION

Figure 1:
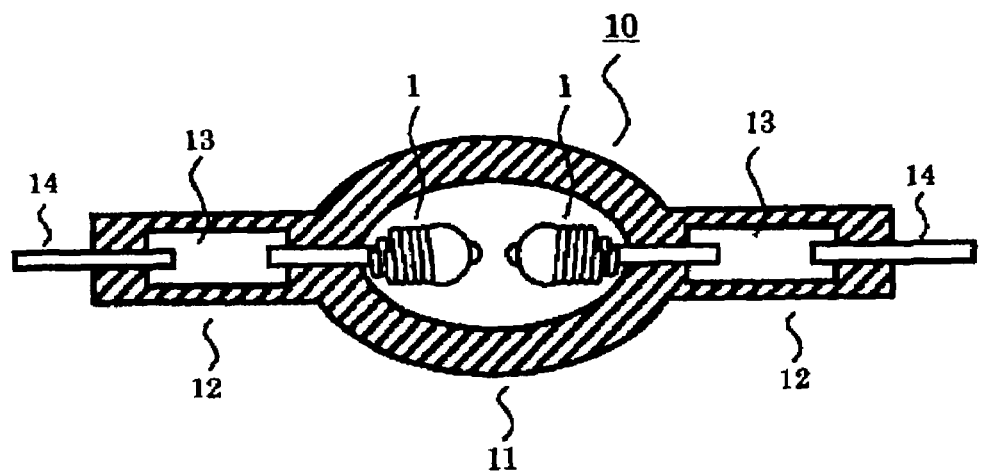
FIG. 1 is a schematic depiction of a discharge lamp of the invention.

FIG. 1 schematically shows the overall arrangement of the short arc discharge lamp 10 in accordance with the invention (hereinafter also called only a "discharge lamp"), which has an essentially spherical light emitting part 11 which is formed by a silica glass discharge vessel. In this light emitting part 11, there is a pair of opposed electrodes 1. At each of opposite ends of the light emitting part 11 there extend hermetically sealed portions 12 in which a molybdenum conductive metal foil 13 is hermetically sealed, for example, by a shrink seal. For each of the electrodes 1, the electrode rod is electrically connected to one end of a respective metal foil 13 by welding. An outer lead 14 is welded to the other end of the respective metal foil 13.

The light emitting part 11 is filled with mercury, a rare gas and a halogen gas. The mercury is used to obtain the required wavelength of visible radiation, for example, to obtain radiant light with wavelengths from 360 nm to 780 nm, and is added in an amount that is at least equal to 0.15 mg/mm$^3$. For this added amount, the vapor pressure also differs depending on the temperature condition, but during operation, is at least equal to 150 atm, therefore an extremely high vapor pressure, is achieved. By adding a still larger amount of mercury, a discharge lamp with a high mercury vapor pressure during operation of at least 200 atm or 300 atm can be produced. The higher the mercury vapor pressure becomes, the more suitable the light source which can be implemented for a projector device.

As the rare gas, for example, roughly 13 kPa argon gas is added, by which the ignitability is improved.

The halogens can be iodine, bromine, chlorine and the like in the form of a compound with mercury or other metals. The amount of halogen added is selected from the range of 10$^{-6}$ μmole/mm$^3$ to 10$^{-2}$ μmole/mm$^3$. The halogen is also intended to prolong the service life using the halogen cycle. However, for an extremely small discharge lamp with a high internal pressure, such as the discharge lamp of the invention, the main purpose of adding the halogen is to prevent devitrification of the discharge vessel.

The numerical values of the discharge lamp are shown by way of example below.

For example:
the maximum outside diameter of the light emitting part is 10.0 mm;
the distance between the electrodes is 1.0 mm;
the inside volume of the arc tube is 65 mm$^3$ and
the rated wattage is 200 W.

The lamp is operated at 150 Hz using an alternating current.

Such a discharge lamp is installed in a projector device which should be as small as possible. Since, on the one hand, the overall dimensions of the device become extremely small and since, on the other hand, there is a demand for high light intensity, the thermal influence in the arc tube portion is extremely strict. The value of the wall load of the lamp is 0.8 W/mm$^2$ to 2.0 W/mm$^2$, specifically 1.5 W/mm$^2$.

That the lamp has such a high mercury vapor pressure and such a high value of the wall load leads to the fact that it can offer radiant light with good color rendering if it is installed in a projector device or a presentation apparatus such as an overhead projector or the like.

Figure 2:
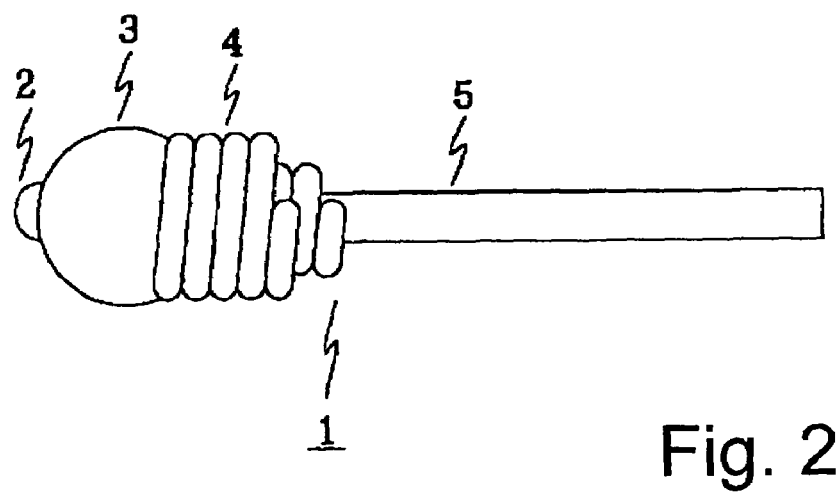
FIG. 2 schematically shows the arrangement of the electrode of a discharge lamp in accordance with the invention.

FIG. 2 schematically shows an enlarged view of the electrode 1. In FIG. 2, the electrode 1 has a tip 2, a melt part with a larger diameter 3, a coil part 4 and a rod 5. The tip 2 is formed on the head of the large diameter melt part. As is described below, there is a case in which the tip 2, in the course of operation of the discharge lamp, forms naturally and grows, and a case in which, using the tip of the electrode rod 5, it is formed beforehand. In the former case, it is formed by the amount of added halogen, the electrode temperature and the like and is designed to regulate the distance between the electrodes in a self-regulating manner.

The part with the greater diameter 3 is formed, for example, by winding filamentary tungsten around the shaft in the manner of a coil and melting it proceeding from this state. The melted part with a greater diameter 3 therefore becomes more solid by the melting of the coil, and moreover, can increase the thermal capacity. Since especially the discharge lamp of the invention has extremely strict thermal conditions within the light emitting part 11, the presence of this part with a greater diameter 3 is important.

The coil part 4 is formed by the front part being melted proceeding from the state in which the above described tungsten is wound in the manner of a coil, by the part with a greater diameter 3 being formed in this way, and by the remaining back end remaining in the form of a coil. The coil part 4 when starting operation acts as the starter (start position) due to the concave-convex (asperity) effect of the surface. Moreover, it has the function of a heat radiator by the concave-convex (asperity) effect of the surface and the thermal capacity after starting operation.

Figure 3A:
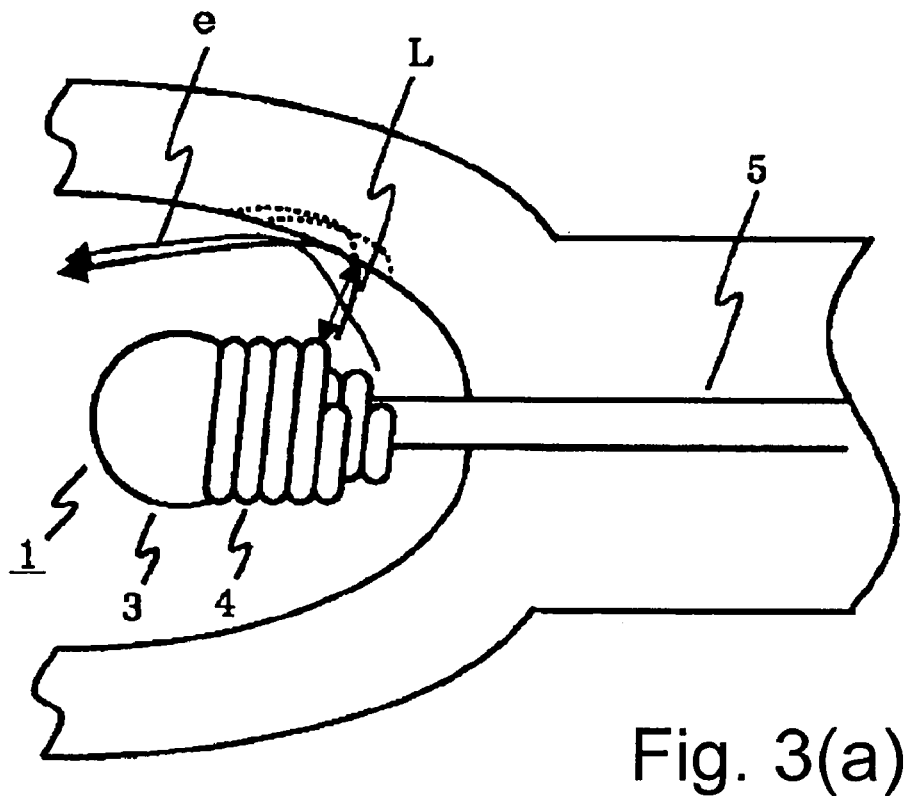
FIGS. 3(a) & 3(b) each schematically show the arrangement of one electrode of a discharge lamp in accordance with the invention.

FIGS. 3(a) and 3(b) each show the arrangement of the vicinity of the base point of the electrode in an enlarged view. FIGS. 3(a) and 3(b) show the same arrangement; but, FIG. 3(a) is provided with reference numbers in order to describe the material components, while FIG. 3(b) is provided with reference numbers in order to describe the physical phenomenon within the light emitting part.

When the lamp is installed as a light source in a projector device, such as the discharge lamp of the invention, due to the great demand for reducing the size of the projector device, there is also a great demand for reducing the size of the discharge lamp in itself. On the other hand, as a heat radiation measure it is necessary that the electrodes, to a certain extent, have a thermal capacity because the discharge lamp is operated under high temperature conditions. Thus, there is the situation in which the electrodes necessarily must have a certain size (volume). This means that a situation arises in which the volume of the electrodes increases according to the reduction in the size of the discharge lamp.

The distance L between the coil part 4 of the electrode 1 and the wall (inside surface) of the discharge vessel (light emitting part 11) therefore becomes extremely small, as is shown in the drawings. The distance L as a numerical value is, for example, at most 2.0 mm. Specifically, there are also lamps with a distance L of at most 1.5 mm or 1.0 mm. The distance L is defined here as the shortest distance between the coil part and the wall of the discharge vessel.

The following can be imagined.

This shortening of the distance between the electrode and the inner surface of the discharge vessel causes contact of the discharge arc with the inner surface of the discharge vessel when the discharge arc forms at the beginning of start-up of the lamp, the back end of the coil acting as the starting point.

These numerical values are theoretically different according to the construction specifications of the discharge lamp. Therefore, it is not actually desirable to define them as absolute values. However, since the size of the projector device and the desired efficiency of the light source in the applicable technical area are to a certain extent fixed, with consideration of this background, essentially the above described numerical values are obtained.

Figure 3:
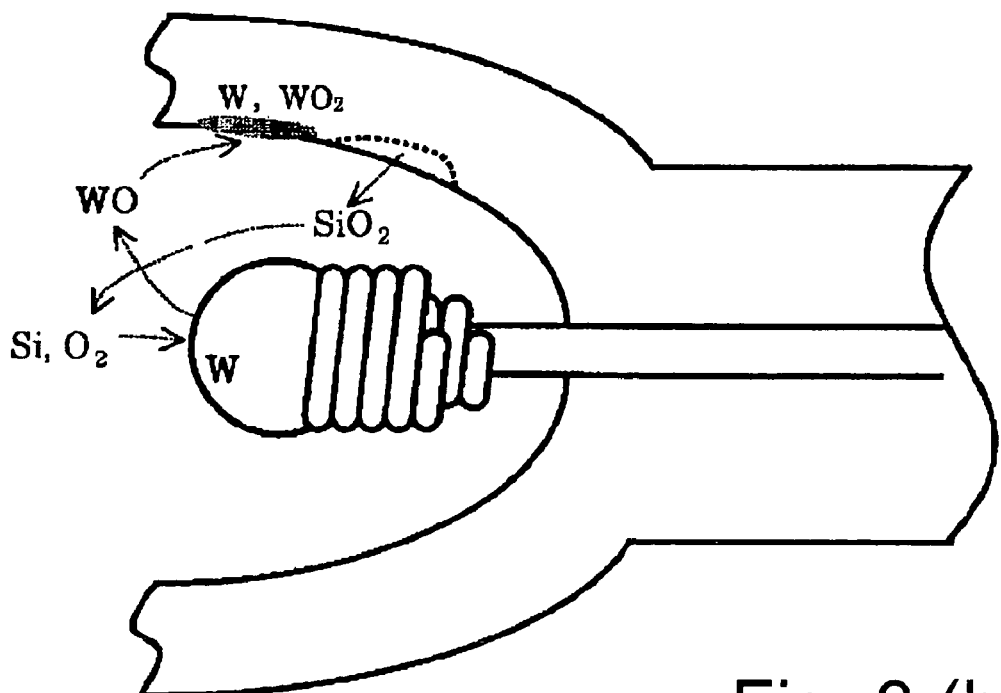

The physical phenomenon is described below with reference to FIGS. 3(*a*) and 3(*b*).

If an arc forms from the back end of the coil 4, it comes into contact with the inner surface of the discharge vessel or it collides with the inner surface as is shown in the drawings. In this way, local hollowing of the inner surface of the discharge vessel and vaporization of the silica glass ($SiO_2$) of which the discharge vessel is made are caused. The vaporized $SiO_2$ is split into Si and O by the plasma discharge and causes vaporization of tungsten as tungsten oxide WO from the electrode. When this oxide of tungsten travels by convection to the vicinity of the inner surface of the discharge vessel which is an area with a relatively low temperature, it remains partially as a halogen compound such as $WO_2Br_2$ or the like in the gas. However, it is partially deposited as tungsten (oxide), such as tungsten, $WO_2$ or the like, on the inner surface of the discharge vessel; this leads to blackening of the tube wall.

The above described phenomenon occurs in a discharge lamp in which the coil and the inner surface of the discharge vessel have approached one another very closely. However, the inventors found that, by decreasing the current which is supplied to the discharge lamp at the beginning of start-up, the effect of contact is small even if the discharge arc which forms from the back end of the coil were to come into contact with the inner surface of the discharge vessel, and that this disadvantage does not occur.

The discharge lamp in accordance with the invention is a discharge lamp of the alternating current operating type. However, at the start of operation, to stabilize the discharge, a direct current is supplied. Specifically, a so-called re-ignition voltage is formed when, during the interval of the glow discharge at the beginning of startup, the polarity of the current flowing in the discharge lamp reverses. As a result, the discharge lamp is extinguished, or, if the lamp is not extinguished, very unstable flickering occurs.

The invention is characterized in that, when a direct current is supplied when operation of the discharge lamp starts, a current is supplied which, at the start, is 0.3 to 0.6 times as great as the rated current and afterward is 1.0 to 2.0 times as great as the rated current.

Figure 4:
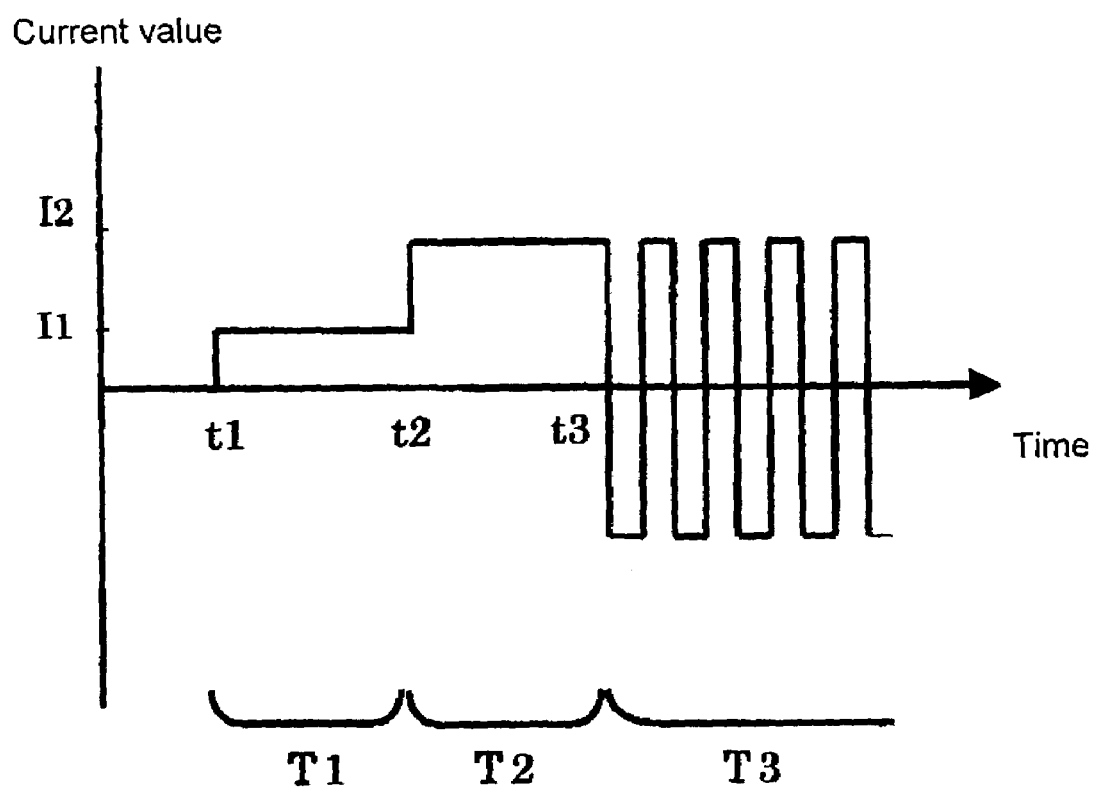
FIG. 4 is a graph of the current waveform of a device in accordance with the invention for operating a discharge lamp.

FIG. 4 shows the waveform of the current which is supplied to the discharge lamp by the power supply. Here, the y-axis plots the current value and the x-axis plots the time.

When, at time t1, operation of the discharge lamp begins, a direct current I1 flows in the discharge lamp. This current value I1 is 0.3 to 0.6 times as great as the rated current value. This interval is represented by T1.

At time t2, the current value increases from I1 to I2. This current value is 1.0 to 2.0 times as great as the rated current. This interval is represented by T2.

At time t3, the current changes from a direct current into an alternating current. Afterwards, an alternating current is supplied. This interval is represented by T3. It makes no difference if the current value of the alternating current changes during the operating time.

The operating device of the invention, as was described above, is characterized in that the direct current at the start of operation changes from a state with a small current value (current value I1) into a state with a large current value (current value I2).

The reason for the supply of a direct current with a small current value at the start of operation lies in that, even upon contact of the discharge arc which forms from the back end of the coil with the inner surface of the discharge vessel, the effect thereof can be made small.

The reason for increasing the current value afterwards is the following.

When switching takes place in an alternating current operating state, the other electrode becomes an electrode for electron emission (cathode). Therefore, it is difficult for this electrode to emit electrons in the state in which it is not sufficiently heated. This means that, by increasing the amount of current in the direct current operating state, the temperature of the two electrodes is increased.

Thus, in the direct current operating state, during the interval in which the arc start point is located on the back end of the coil and in which it is possible for the discharge arc to come into contact with the inner surface of the discharge vessel, the current value is reduced in order to adequately reduce the effect thereof on the inner surface of the discharge vessel. Moreover, after the transition of the arc start point to the electrode head, the current value is increased in order to raise the electrode temperature.

It can be stated that this regulation of the start of operation in a discharge lamp which, of course, is operated in steady-state operation using a direct current is effective regulation. Furthermore, it can be stated that this regulation is important for a discharge lamp which has an electrode arrangement in which there is a coil part which has approached the inside wall of the discharge vessel very closely.

The current value I1 is 0.3 to 0.6 times as great as the rated current value. When it is smaller than this numerical value, operation cannot be adequately maintained. When it is larger than this numerical value, the above described effect on the inner surface of the discharge vessel cannot be adequately reduced. Furthermore, it is more advantageous if the current value I1 is 0.4 to 0.5 times as great as the rated current value and when the interval T1 is 1 to 15 seconds.

The current value I2 is 1.0 to 2.0 times as great as the rated current value. The reason for this is the following:

If it is smaller than this numerical value, the electrodes cannot be adequately heated. If it is greater than this numerical value, it is possible for the electrodes to be overheated and to deform. Furthermore, it is more advantageous if the current value I2 is 1.0 to 1.2 times as great as the rated current value and if the interval T2 is 2 seconds to 10 seconds.

Here, the term "rated current" is defined as a design average in steady-state operation of this discharge lamp, therefore an RMS value. For example, in a lamp with 200 W it is 2.8 A.

The change of the current value I1 to I2 is not limited to the stepwise change shown in the drawings, but can also be a phased change with repeated steps or even a gradual change.

Alternating current operation is carried out, for example, with 50 Hz to 400 Hz.

Figure 5:
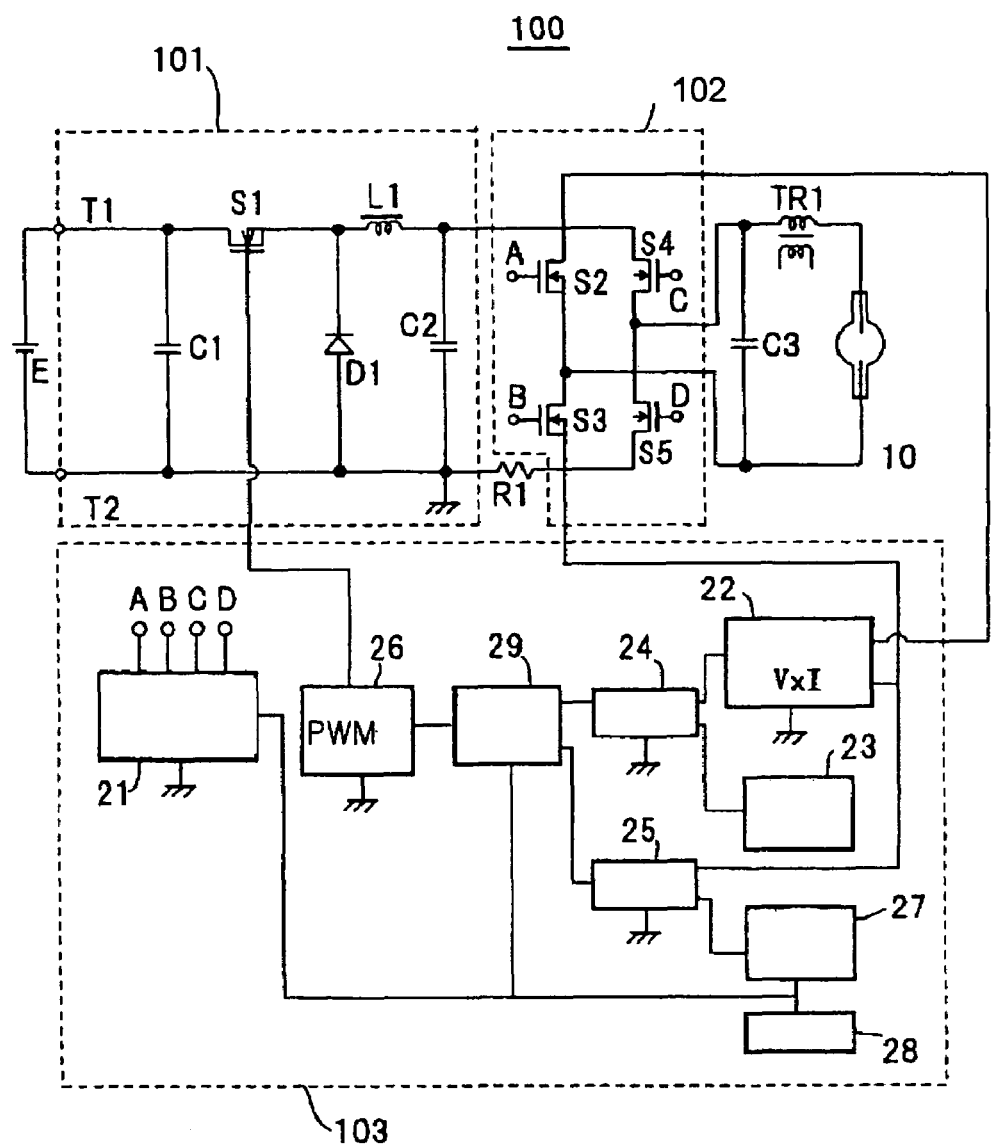
FIG. 5 is a circuit diagram of the device of the invention for operating a discharge lamp.

FIG. 5 shows a device of the invention for operating a discharge lamp 100 and constitutes a discharge lamp 10 and a power supply. The power supply is comprised of a switching part 101, a full bridge circuit 102 and a control element 103.

The operating device 100 comprises a switching part 101, a full bridge circuit 102 and a control element 103 which controls the switching part 101 and the full bridge circuit 102. The full bridge circuit 102 comprises switching devices S2 to S5 which convert the direct current power of the switching part 101 into alternating current power with rectangular waves. The switching part 101 controls the power by pulse width control of a switching device S1.

A transformer TR1, as an ignitor, is series connected to the discharge lamp 10. A capacitor C3 is series connected to the discharge lamp 10 and the transformer TR1. The series connection of the discharge lamp 10 and the transformer TR1 is supplied with alternating current with rectangular waves from the full bridge circuit 102, and thus, the discharge lamp is operated.

The switching part 101 comprises a capacitor C1, the switching device S1 which carries out switching by the output of the control element 103, a diode D1, an inductance L1 and a smoothing capacitor C2. The ON/OFF ratio of the switching device S1 is controlled by a PWM (pulse width modulation) part 26 of the control element 103. Thereby the power (discharge power) supplied to the discharge lamp 10 via the full bridge circuit 102 is controlled.

To determine the current which is supplied from the switching part 101 to the discharge lamp 10, there is a current determination resistor R1 for between the switching part 101 and the full bridge circuit 102.

Power control is carried out as follows:

First, a voltage signal between both ends of current determination resistor R1 and a voltage signal between both ends of the smoothing capacitor C2 are supplied to a multiplication device 22, and a power signal, as the multiplication result thereof, is supplied to one of the input terminals of a comparator 24. A power reference signal is supplied to the other input terminal of the comparator 24 from the power adjustment device 23. The comparator 24 sends a voltage signal to the PWM part 26 which is proportional to the difference between the above described two inputs. The PWM part 26 controls the ON/OFF ratio of the switching device S1 such that the input signal from the comparator 24 reaches 0. As a result, the discharge power is kept at the set power.

The control element 103 has a current control function in order to control the direct current at the beginning of start-up. This means that a voltage signal between both ends of the current determination resistor R1 and a current reference signal from a current adjustment device 27 are supplied to the input terminals of a comparator 25 which sends to a voltage signal to the PWM part 26 which is proportional to the difference between the above described two inputs. The PWM part 26 controls the ON/OFF ratio of the switching device S1 such that the input signal from the comparator 25 reaches 0. As a result, the discharge current is adjusted to the set current.

The output signals from the comparator 24 and the comparator 25 are sent via a signal selection device 29 to the PWM part 26. If the output signal of the comparator 24 is selected by the signal selection device 29, the wattage is regulated. When the output signal of the comparator 25 is selected, the current is controlled.

The full bridge circuit 102 comprises the switching devices S2 to S5 which are comprised of a transistor or a FET which is connected in a bridge-like manner and of the diodes D2 to D5 which are connected to the switching devices S2 to S5 in an anti-parallel manner. The switching devices S2 to S5 are driven by a full bridge driver circuit 21 which is located in the control element 103. The discharge lamp 10 is operated by supplying an alternating current with rectangular waves to the discharge lamp 10.

This means that the switching devices S2, S5 and the switching devices S3, S4 are turned on in alternation, the discharge lamp 10 is supplied with an alternating current with rectangular waves in the line path switching part 101→ switching device S2→ discharge lamp 10→ switching device S5→ switching part 101 and in the line path switching part 101→ switching device S4→ discharge lamp 10→ switching device S3→ switching device 101 and the discharge lamp 10 is operated.

The control element 103 has a full bridge driver circuit 21 which generates driver signals of the switching devices S2 to S5.

The operation of this operating circuit, beginning with startup of the lamp until the transition into alternating current operation, is described below.

In the discharge lamp 10, the high voltage pulse of the ignitor causes an dielectric breakdown by which the discharge current begins to flow and by which a timer 28 begins counting. The output of the timer 28 is input into the full bridge driver circuit 21 and the signal selector device 29. The full bridge driver circuit 21 fixes the polarity of the full bridge part 102 to one of the two until the counting of the timer 28 reaches a given value (for example, 10 seconds). The signal selection device 29 selects the output of the comparator 25 and sends it to the PWM part 26. In this way, for the above described given time (for example, 10 seconds) after the start of discharge direct current is supplied to the discharge lamp 10, and moreover, current regulation is carried out.

The counting output of the timer 28 is also output to current setting device 27. The current setting device 27, according to the counting value of the timer 28, outputs a reference current signal which changes in a step-wise manner, such as, for example, at times t1 to t3 in FIG. 4. In this way, the discharge lamp is supplied with a discharge direct current which changes, for example, in a step-wise manner.

When the counting output of the timer 28 reaches a given value (for example, 10 seconds) the full bridge driver circuit 21 begins polarity switching of the full bridge part 102. Moreover the signal selection device 29 selects the output of the comparator 24 and sends it to the PWM part 26. In this way, after the above described given time (for example, 10 seconds) has passed since the start of discharge, alternating current is supplied to the discharge lamp 10, and moreover, wattage regulation is carried out.

The numerical values are shown by way of example below.

At a rated wattage of 200 W
the rated current is 2.8 A;
the current value I1 is 1.0 A and
the current value I2 is 3.0 A.

The numerical values of the discharge lamp are shown by way of example below.

The outside diameter of the light emitting part is in the range from 8 mm to 12 mm and is, for example, 10.0 mm;
the inside volume of the light emitting part is in the range from 50 mm$^3$ to 120 mm$^3$ and is, for example, 65 mm$^3$; and the distance between the electrodes is in the range from 0.7 mm to 2 mm and is, for example, 1.0 mm.

The discharge lamp is operated with a rated wattage of 200 W and a wave with a rectangular shape of 150 Hz.

The numerical values of the electrode arrangement are shown, by way of example, below.

The diameter of the melt part with a greater diameter 3 is 1.0 mm to 2.0 mm and is, for example, 1.4 mm;

the length in the axial direction of the melt part with a greater diameter 3 is 0.7 mm to 2.0 mm and is, for example, 1.0 mm;

the diameter of the coil part 4 is 1.0 mm to 2.0 mm and is, for example, 1.3 mm;

the length in the axial direction of the coil part 4 is in the range from 1.0 mm to 2.0 mm and is, for example, 1.5 mm;

the diameter of the electrode axis 5 is in the range from 0.2 mm to 0.6 mm and is, for example, 0.4 mm;

the length of the electrode axis 5 is in the range from 5.0 mm to 10.0 mm and is for, example, 7.0 mm;

the wire diameter of the coil is in the range from 0.1 mm to 0.3 mm and is, for example, 0.25 mm;

the diameter of the tip 2 is 0.15 mm to 0.6 mm and is, for example, 0.3 mm; and the length in the axial direction of the tip 2 is 0.1 mm to 0.4 mm and is, for example, 0.25 mm.

The melted part with a greater diameter can be formed by melting a coil by means of irradiation with laser light or the like.

Furthermore the laser light beam diameter is 0.2 mm to 0.7 mm and is, for example, 0.6 mm; and the duration of irradiation is 0.2 sec to 1.0 sec, and is, for example, 0.35 sec.

It is advantageous that irradiation with laser light is carried out in an atmosphere of argon gas or the like in order to prevent oxidation of the electrodes.

The laser light irradiation for producing the melt part with a greater diameter can be carried out without interruption. However, pulsed irradiation can also be carried out. In this case, the expression "pulsed irradiation" is defined as irradiation in which irradiation is repeated with a short duration (millisecond range) and a pause. This irradiation is normally more effective than uninterrupted irradiation.

Instead of laser light irradiation, electron beams can also be used for irradiation. Since, in an electron beam as well as in laser light, the diameter of the beam can be made small, an electron beam is suited for melting a small coil with regulation as in the invention.

With respect to electron beams, for example, the electron beam devices disclosed in Japanese patent disclosure document 2001-59900 and Japanese patent disclosure document 2001-174596 are especially suited due to their small shape.

As was described above, lamp extinction as a result of polarity switching can be advantageously prevented by the device of the invention for operating the discharge lamp by start-up using a direct current at the start of operation for a discharge lamp of the alternating current operation type.

Furthermore, even when the discharge arc which originates from the back end of the coil comes into contact with the inner surface of the discharge vessel, the effect of it can be reduced by a direct current with a small current value being supplied at the start of operation and afterwards the current value being increased. By this measure, moreover, the temperature of the electrodes can be increased, and therefore, the transition into alternating current operation can be advantageously carried out.

The device in accordance with the invention for operating a discharge lamp has some preconditions. The action and the effect of the invention can only be developed when these preconditions are met.

First of all, a discharge lamp is assumed which is operated in steady-state operation using an alternating current and at the start of operation using a direct current. This is because in a discharge lamp of this operating type the disadvantage of lamp extinction due to a low electrode temperature occurs when switching from direct current operation into alternating current operation.

Even if there were a regulation process as in the prior art in which, at the start of operation, the current value is changed in a discharge lamp which is operated in steady-state operation using a direct current, this content therefore, in the sense of the technical object, is completely different than the invention.

Secondly, in the discharge lamp of the invention, a short arc discharge lamp is assumed in which the distance between the electrodes is at most 2 mm and in which the light emitting part is filled with at least 0.15 mg/mm$^3$ mercury, rare gas and halogen in the range from $1 \times 10^{-6}$ μmole/mm$^3$ to $1 \times 10^{-2}$ μmole/mm$^3$.

The reason for this is that, in a discharge lamp with this arrangement, the SiO which has been released from the inner surface of the discharge vessel is split by the discharge plasma into Si and O, that the tungsten of the electrodes reacts with the oxygen (O) in this discharge space, that in this way tungsten oxide is produced and that, therefore, transport of the excess tungsten from the electrodes to the inner surface of the discharge vessel takes place. If here the amount of oxygen (O) is suitable, it acts like in the halogen cycle and has the function of suppressing the transport of the tungsten (W) to the inside wall of the discharge vessel. However, in the case of a large amount of oxygen, as in the discharge lamp of the invention, the tungsten oxide ($WO_x$) in the discharge space increases, by which excess tungsten oxide is transported to the inside wall of the discharge vessel.

Third, a discharge lamp with an electrode arrangement (the arrangement shown in FIG. 2) is assumed in which a coil is melted to the electrode rod. When operation starts, on the back end of the coil part, a discharge starting point is formed by which the disadvantage of collision and contact of the arc with the inner surface of the discharge vessel occurs. This problem arises distinctly in the case of a small, extremely short distance (distance L in FIG. 3(*a*)) between the coil part and the inner surface of the discharge vessel. This is because as a result of the small, extremely short distance L the arc collides and comes into contact with the inner surface of the discharge vessel by the discharge starting point which has formed on the back end of the coil part. Specifically, the shortest distance L is at most 2.0 mm. The collision and contact occur especially clearly at an extremely short distance L of at most 1.5 mm or 1.0 mm.

In a discharge lamp with a great distance L, the phenomenon of collision and contact of the discharge arc with the inner surface of the discharge vessel, the back end of the coil part acting as the starting point, therefore rarely occurs. This means that the technical object of the invention is therefore originally not present.

Thus, it may be that an arrangement in which the electrode is wound with a coil, is conventionally known among those discharge lamps which do not have the above described arrangement and which have completely different applications. However, since in such a discharge lamp originally the phenomenon of collision and contact of the arc with the inner surface of the discharge vessel does not occur, that is, there is no technical object, it can be stated that this prior art has a completely different level than the invention.

The discharge lamp of the invention is characterized in that the electrode head is provided with a tip. The electrode head can be quickly subjected to a temperature increase by this tip in the transition from direct current operation at the beginning of start-up into alternating current operation. The arc discharge is therefore quickly stabilized, and in the case of a short arc discharge lamp in which the light emitting part is filled with at least 0.15 mg/mm$^3$ of mercury, rare gas and halogen in the range from $1 \times 10^{-6}$ μmole/mm$^3$ to $1 \times 10^{-2}$ μmole/mm$^3$, by extending this tip in a self-regulating manner, regulation of the distance between the electrodes to an optimum value is enabled.

By forming the tip beforehand using the electrode rod, it can control beforehand the direction of extension in a self-regulating manner. However, it is also possible not to form the tip in the production of the discharge lamp, but to form it proceeding from a so-called zero state in the course of lamp operation.

It is desirable for the electrode to be made of tungsten with a purity of at least 99.9999%. This is because, in the case of emission of impurities which are contained in the electrodes into the discharge space, devitrification and blackening of the discharge vessel are caused.

Figure 6:
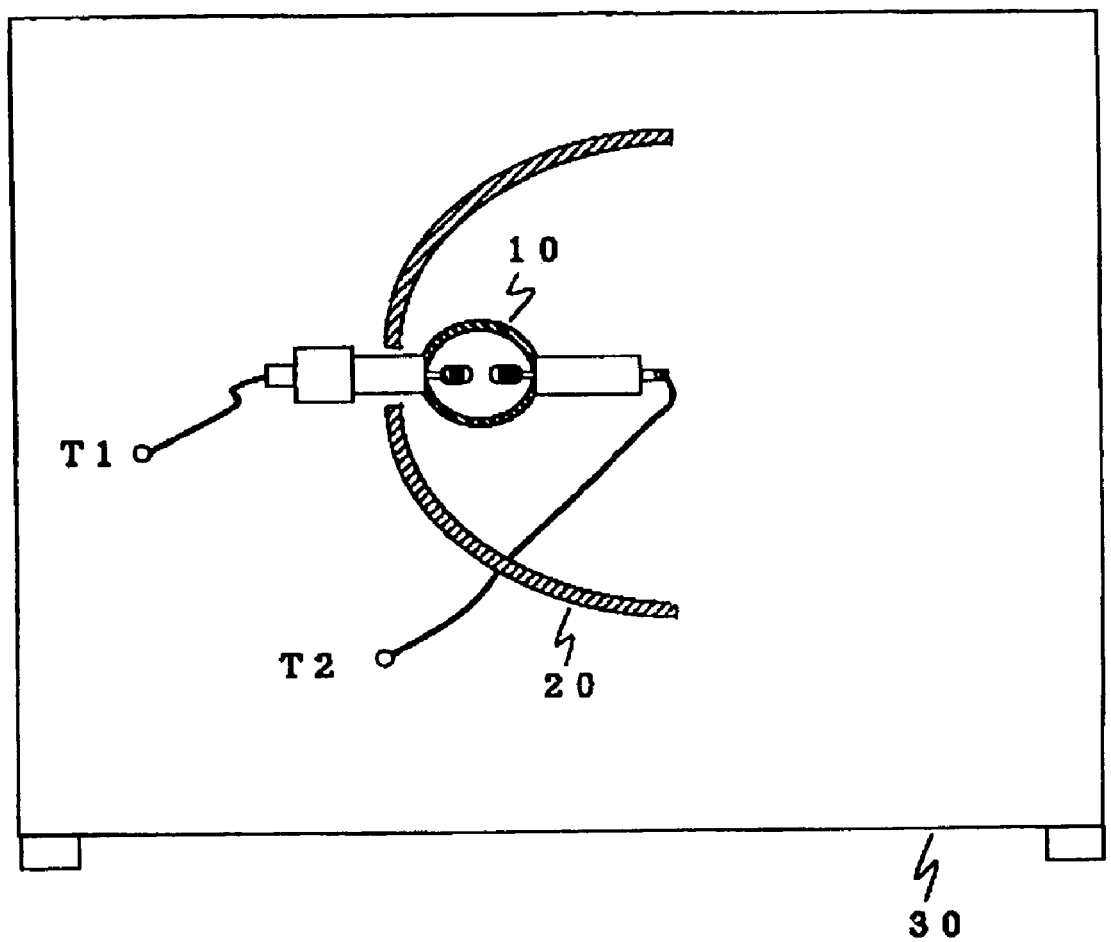
FIG. 6 schematically shows a light source device using the ultra-high pressure mercury lamp of the invention.

FIG. 6 shows the state in which a concave reflector 20 which surrounds the discharge lamp 10, and the combination of these two with one another (hereinafter, the combination of the discharge lamp 10 with the concave reflector 20 is called a "light source device") are installed in a projector device 30. In the projector device 30, the optical parts, electrical parts, and the like which are complex in reality are tightly arranged. It is shown simplified in FIG. 6 to facilitate the description.

The discharge lamp 10 is held extending through a hole in the concave reflector 20. An operating device (not shown) is connected to the terminals T1 and T2 of the discharge lamp 10. For a concave reflector 20, an elliptical reflector or a parabolic reflector is used. The reflection surface is provided with a film which has been formed by evaporation and which reflects light with given wavelengths.

The focal position of the concave reflector 20 is aligned to the arc position of the discharge lamp 10. The light of the arc spot can emerge with high efficiency through the reflector. Furthermore, the concave reflector 20 can also be provided with transparent glass which closes the front opening.

Action of the Invention

As was described above, the device in accordance with the invention for operating a discharge lamp comprises a discharge lamp of the short arc type in which, in the silica glass arc tube, there is a pair of opposed electrodes at a distance from each other of at most 2 mm and the tube is filled with at least 0.15 mg/mm$^3$ of mercury, rare gas and halogen in the range from $1 \times 10^{-6}$ μmole/mm$^3$ to $1 \times 10^{-2}$ μmole/mm$^3$. The head of at least one of the electrodes has a melt part which has been formed by winding the electrode rod with a coil and by melting the part of the coil which is oriented toward the electrode head at least in the area of its surface, and a part of the coil extends form the melt part continuously and integrally in the direction away from the electrode head. Furthermore, a power supply is provided which supplies the discharge lamp with direct current when operation is starting and afterwards with an alternating current, and is characterized by the direct current supplied by the power supply to the discharge lamp at the start is 0.3 to 0.6 times as great as the rated current and afterwards 1.0 to 2.0 times as great as the rated current.

By this arrangement, operation of the lamp is started using a direct current. In this way lamp extinction can be advantageously prevented in an unstable discharge state at the start of operation.

Furthermore, even when the discharge arc which forms from the back end of the coil comes into contact with the inner surface of the discharge vessel, the effect of it can be reduced by a direct current with a small current value being supplied at the start of operation and afterwards the current value being increased. Moreover, by this measure, the temperature of the electrodes can be increased, and therefore, the transition into alternating current operation can be advantageously carried out.

What is claimed is:

1. A device for operating a short arc discharge lamp, comprising:
   a short arc discharge lamp having a silica glass arc tube containing a pair of opposed electrodes that are spaced at a distance of at most 2 mm from each other and which is filled with at least 0.15 mg/mm$^3$ of mercury, a rare gas, and halogen in an amount within the range from $1 \times 10^{-6}$ μmole/mm$^3$ to $1 \times 10^{-2}$ μmole/mm$^3$; and
   a power supply which supplies the discharge lamp with direct current when operation is starting and afterwards with an alternating current,
   wherein at least one of the electrodes has a melted part towards the electrode head which has been formed by winding an electrode rod with a coil and by melting a part of the coil which is oriented toward the electrode head at least in a surface area thereof, and which has a coil part which extends from the melt part continuously and integrally with it in a direction away from the electrode head, and
   wherein the direct current supplied to the discharge lamp is initially 0.3 to 0.6 times as great as the rated current and then is increased to 1.0 to 2.0 times as much as the rated current.

2. Device for operating a short arc discharge lamp as claimed in claim 1, wherein the shortest distance between the coil part and an inside surface of the arc tube is at most 2.0 mm.

3. The device for operating a short arc discharge lamp as claimed in claim 1, wherein the electrode is made of tungsten with a purity of at least 99.9999%.

4. The device for operating a short arc discharge lamp as claimed in claim 1, wherein a tip is formed on the head of the electrode.

5. A method for operating a short arc discharge lamp having a silica glass arc tube containing a pair of opposed electrodes that are spaced at a distance of at most 2 mm from each other and which is filled with at least 0.15 mg/mm$^3$ of mercury, a rare gas, and halogen in an amount within the range from $1 \times 10^{-6}$ μmole/mm$^3$ to $1 \times 10^{-2}$ μmole/mm$^3$; and a power supply which supplies the discharge lamp with direct current when operation is starting and afterwards with an alternating current, wherein at least one of the electrodes has a melted part towards the electrode head which has been formed by winding an electrode rod with a coil and by melting a part of the coil which is oriented toward the electrode head at least in a surface area thereof, and which has a coil part which extends from the melt part continuously and integrally with it in a direction away from the electrode head, comprising the steps of:

operating said the power supply to supply the direct current to the discharge lamp for an initial time period at a level that is 0.3 to 0.6 times as great as the rated current, then, increasing the level of the direct current being supplied to 1.0 to 2.0 times as much as the rated current for a second time period, and then, supplying alternating current to the discharge lamp.

6. The method for operating a short arc discharge lamp according to claim 5, wherein said first time period is from 1 to 15 seconds and wherein said second time period is from 2 to 10 seconds in length.

* * * * *